United States Patent [19]

Koshizuka et al.

[11] Patent Number: 4,973,987

[45] Date of Patent: Nov. 27, 1990

[54] THERMAL RECORDING HEAD

[75] Inventors: Kunihiro Koshizuka; Shigehiro Kitamura; Shigeru Mano; Takao Abe, all of Hino, Japan

[73] Assignee: Konica Corporation, Tokyo, Japan

[21] Appl. No.: 365,087

[22] Filed: Jun. 12, 1989

[30] Foreign Application Priority Data

Jun. 22, 1988 [JP] Japan ................................ 63-154021

[51] Int. Cl.[5] ........................ G01D 15/10; G01D 9/00

[52] U.S. Cl. ....................... 346/76 PH; 346/1.1.139 C

[58] Field of Search ............... 346/1.1, 76 PH, 139 C; 219/216 PH

[56] References Cited

U.S. PATENT DOCUMENTS

| | | | |
|---|---|---|---|
| 4,476,377 | 10/1984 | Tatsumi et al. | 219/216 PH |
| 4,712,637 | 12/1987 | Mogi et al. | 180/219 |
| 4,724,445 | 2/1988 | Amano et al. | 346/76 PH |
| 4,725,835 | 2/1988 | Schreiner et al. | 340/825.83 |
| 4,733,251 | 3/1988 | Murakami et al. | 346/76 PH |
| 4,746,933 | 5/1988 | Asakura | 346/76 PH |
| 4,780,729 | 10/1988 | Murakami et al. | 346/76 PH |

FOREIGN PATENT DOCUMENTS

| | | | |
|---|---|---|---|
| 0194528A2 | 9/1986 | European Pat. Off. . | |
| 3614840A1 | 11/1986 | Fed. Rep. of Germany . | |
| 3721925A1 | 1/1988 | Fed. Rep. of Germany . | |
| 0120473 | 7/1984 | Japan | 219/216 PH |
| 0068972 | 4/1985 | Japan | 219/216 PH |
| 0208958 | 9/1987 | Japan | 346/76 PH |

*Primary Examiner*—Bruce A. Reynolds
*Assistant Examiner*—Huan Tran
*Attorney, Agent, or Firm*—Frishauf, Holtz, Goodman & Woodward

[57] ABSTRACT

A thermal head for transferring heat-sensitive ink material coated on an ink support onto a recording sheet comprises heating elements capable of coming in pressure contact with the support for heating a transfer part of the ink support. A pressing protrusion then presses the heated transfer part of the ink support onto the recording sheet with a pressing force larger than that exerted during the pressure contact with the heating elements. A base plate holds the heating elements and the pressing protrusion such that the pressing protrusion is disposed on the base plate spaced apart from the heating elements. The pressing protrusion protrudes higher from the base plate than does the heating elements.

9 Claims, 4 Drawing Sheets

THERMAL RECORDING HEAD

BACKGROUND OF THE INVENTION

This invention relates to a heat-sensitive recording method and a thermal head, and more particularly to such a method and head which can print at high speed with excellent printing quality even onto a recording member having a rough surface.

Recently, according to the popularization of word processing and other heat-sensitive transfer equipment, heat sensitive recording methods using thermal heads, etc. to transfer the heat sensitive recording media (or ink material) to transfer media such as recording paper, etc. have been widely employed.

By the above-described heat-sensitive recording method using a thermal head, a part of the ink layer of the heat-sensitive recording medium is heated by a dot printing unit and is transferred to the transfer medium under pressure applied at the same time and then the supporting member of the heat-sensitive recording medium is separated, thereby the above-described part is transferred to the transfer medium.

In such heat-sensitive recording method, various devices have been made for the ink layer to improve the printing quality even for transfer media of low surface smoothness and heat-sensitive heads as follows have been proposed: a thermal head which is designed so that the above-described part is separated from the supporting means as quickly as possible by positioning the dot printing unit of the thermal head near the edge of the board, a thermal head positioned at a certain inclination angle to the transfer medium to increase the platen pressure, a thermal head in which a double glaze layer is formed projecting on the surface opposing to the heat-sensitive recording medium of the board and a heat resistant element is provided at the top of the double glaze layer, etc.

However, in every above-decribed thermal head, the part to be transferred is pressed strongly under pressure by the dot printing unit itself provided with a heat resistant element, and when pressed, the part to be transferred has been melted with very little cohesive power unable to hold its form so that bridging transfer onto concave-convex parts of the transfer medium becomes impossible. In addition, a crushed image is formed, melted ink soaks into paper fiber when the transfer medium is paper, and resultantly, paper fiber may come up to the surface from the image. Furthermore, a void or a blur may result or a stain of the base or trailing by the high temperature dot printing unit may result when it is pressed.

In order to solve the above problems, a heat sensitive recording medium with such an ink layer which has high cohesive power even at the time of transfer to the transfer medium should be used and resultantly, the shearing property at the border between the heated part to be transferred and an ink layer which has not been heated decreases due to the high cohesive power of the ink layer, deteriorating the printing sharpness.

Also in the high speed printing process, sufficient cooling time could not be secured to cool the dot printing unit because of the short pulse cycle of thermal energy and as the result, trailing or stain of the base was caused often in the conventional heat-sensitive heads in which the heat-sensitive head is always pressed strongly by the heat resistant element itself. In super-high-speed printing (80 cps for instance), due to the delay in the softening of the ink layer, effective pressing could not be applied in the printing.

This invention was made based on the above conditions.

That is, the object of this invention is to provide a heat-sensitive recording method and thermal head which can print with less generation of a void, blur, trailing, stain of the base, etc. even for transfer media of low surface smoothness, not to mention transfer medium of high surface smoothness, with high printing quality and especially at high speed.

SUMMARY OF THE INVENTION

According to one aspect of the present invention, a method of transferring heat-sensitive ink material coated on a support onto a recording material, comprises bringing a heating portion of a thermal head in pressure contact with the support for heating a transfer part of the support, for thereby melting the ink material on the transfer part of the support; moving the thermal head relative to the support so as to place a pressing portion of the thermal head at the heated transfer part of the support; and pressing the pressing portion on the heated transfer part of the support and onto the recording material with a pressing force larger than that exerted in the pressure contact by the heating portion, for thereby transferring the ink material from the heated transfer part of the support onto the recording material.

According to another aspect of the present invention, a thermal head for transferring heat-sensitive ink material coated on a support onto a recording material, comprises heating means for coming into pressure contact with the support for heating a transfer part of the support and for exerting a given pressure on the support during the heating; pressing means for pressing the heated transfer part of the support onto the recording material with a pressing force greater than the given pressure exerted in the pressure contact with the heating means; and holding means for holding the heating means and the pressing means thereon, the pressing means being disposed on the holding means spaced apart from the heating means in a direction so as to press the transfer part after the heating by the heating means.

DETAILED DESCRIPTION OF THE INVENTION

The principle of this invention is that an ink layer of a heat-sensitive recording medium is melted by supplying enough heat to melt this ink layer, the melted ink layer is placed in the cooling process to make it have proper cohesive power, proper adhesive strength to the transfer medium, and proper shearing property to an ink layer which has not been heated, and the said ink layer is pressed to the transfer medium by a force larger than the pressing force applied at the time of supplying of thermal energy to the transfer medium.

First, according to this invention, thermal energy is supplied to the part to be transferred of the heatsensitive recording medium.

It is not the subject of this invention whether the ink layer should be melted instantaneously when this thermal energy is supplied. It is enough if the ink layer placed in the cooling process after being melted is pressed. Therefore, the ink layer may be melted immediately by the heating unit or may be melted after the part to be transferred heated by the heating unit has moved from the heating unit.

The heat energy volume or amount to be supplied to the part to be transferred should be enough at least to melt the ink layer of the transfer layer but cannot be determined indiscriminately since it varies depending on the types of the supporting member of the heat-sensitive recording medium, its thickness, and composition and thickness of the ink layer, and other conditions. In other words, the amount of thermal energy may be determined properly according to above-described various factors.

Figure 1:
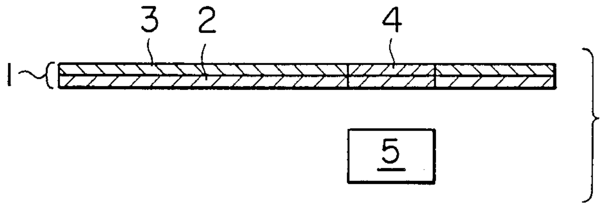
FIG. 1 is an explanatory drawing showing an example of the heat-sensitive recording method according to the invention.

The part to be transferred of the heat-sensitive recording medium is the part of the ink layer 3 of the heat-sensitive recording medium 1 in FIG. 1 which is heated by the heat-generating unit 5 and melted. The heat-generating unit 5 may be of any form and structure if it can supply thermal energy to the ink layer of the heat-sensitive recording medium and melt it.

Figure 2:
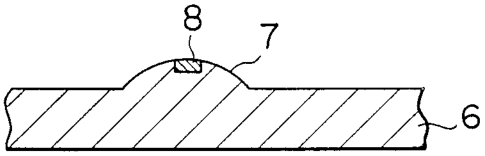
FIG. 2 (PRIOR ART)
FIGS. 2 and 3 are partial sectional views showing a conventional thermal head having a heat-sensitive resistant element.
Figure 3:
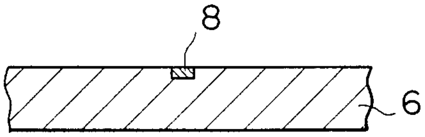
FIG. 3 (PRIOR ART)

As an example of the heat-generating unit 5, as shown in FIG. 2, a projection 7 may be formed on the board or base plate 6 of the thermal head and a heat-generating resistance element 8 may be provided at the top of the projection 7, or at a position slightly out of the top on the side of the projection 7, or as shown in FIG. 3, heating element 8 may be embedded in the board a base plate 6 of the thermal head.

The above-described heat-sensitive recording medium 1 usually has at least a supporting member 2 and ink layer 3 as shown in FIG. 1.

As a supporting member 2, paper, resin film, laminated film comprising paper and resin film, metallic sheet, etc. may be used.

The ink layer 3 usually contains at least a heat-melting substance and carbon black or other color pigments. The ink layer 3 may be one layer or multiple layers more than two.

The form of such a heat-sensitive recording medium is unlimited and may be a tape, ribbon or sheet, for example.

The the part to be transferred of this heat-sensitive recording medium 1 is heated and melted by the above-described heat-generating unit, and the heat-generating unit may bring the melted part to be transferred in pressure contact with the above-described transfer medium. In this invention, since the object of this invention can be attained if the part to be transferred is pressed in the process of cooling the melted ink layer with a pressing force larger than that applied in the heating process, pressing the part to be transferred by the heating unit does not present any adverse effect. Further, even though the melted part to be transferred is pressed against the transfer medium under pressure by the heating unit, the part to be transferred may not be adhered to the transfer medium or moved due to the small cohesive power, and if the ink layer is not melted even if the heating unit heats it, good adhesiveness for the transfer medium may not be revealed in the ink layer, and therefore pressing by the heating unit for transfer offers no adverse effect from this point of view.

According to this invention, thermal energy is supplied to the part to be transferred of the heat-sensitive recording medium and the ink layer melted by it is subjected to a cooling process and the above-described part to be transferred in the cooling process after being melted is pressed by a force larger than that by the above-described heat-generating part.

The pressing part is placed at a place different from the above-described heating part because the ink layer which is heated and melted by the above-described heating part is pressed in the cooling process. In addition, the heating part and pressing part are desirably positioned relative to each other so that in the cooling process they are pressed under proper cohesive power, with proper adhesiveness to the transfer medium, and good shearing property from an ink layer which is not heated.

Good adhesiveness of the ink layer in the cooling process to the transfer medium can be realized by the pressing force of the pressing part to the part to be transferred greater than the pressing force exerted by the heating part. Therefore, it is desirable to design the top of the pressing so as to be nearer to the transfer medium than the heating part. It may not be said that any pressing force by the pressing part to the part to be transferred is permissible if it is larger than that of the heating part. Generally, in order to obtain high printing quality, the pressing force should be large enough, but an overly large force is apt to cause trailing or stain of the base. Therefore, in this invention, it is desirable to make the adjustment of the pressing force to the extent that no trailing or stain of the base occurs and that the highest printing quality can be obtained. As the thermal head provided with the heating unit and pressing unit which can realize the above-described positional relation between the heating unit and pressing unit and the pressing power, various arrangements as shown in FIGS. 4 to 10 can be used for example, though this invention is not limited to the illustrated arrangements.

Figure 4:
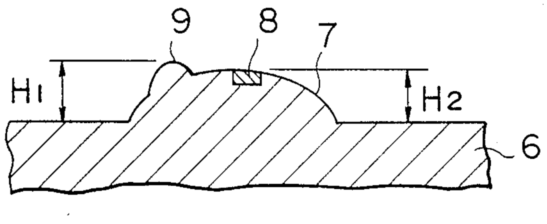
FIGS. 4–10 are partial sectional views showing various forms of thermal heads according to this invention.

The thermal head in FIG. 4 is formed by projecting the pressing part 9 on the side of the projecting part 7 which projects from the surface of the board or base plate 6 and is provided with the heat-generating resistance element 8 on the top. The height $H_1$ of the pressing part 9 above the plane of the board 6 is greater than the height $H_2$ of the top of the above-described projecting part 7 above the plane of the board 6. In this thermal head, the pressing part 9 is separated from the heat-generating resistance element 8.

Figure 5:
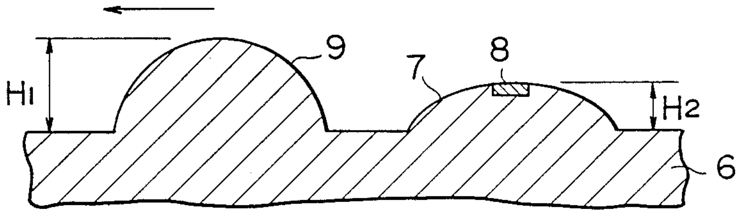

The thermal head in FIG. 5 is formed by projecting the pressing part 9 between the projecting part 7 which projects from the surface of the board or base plate 6 and is provided with the heat-generating resistance element 8 on the top and the edge of the thermal head in the relative progressing direction (arrow mark in the figure) of the heat-sensitive recording medium. In this thermal head also, the height H1 of the pressing part 9 above the plane of the board 6 is greater than the height $H_2$ of the top of the above-described projecting part 7 above the plane of the board 6.

Figure 6:
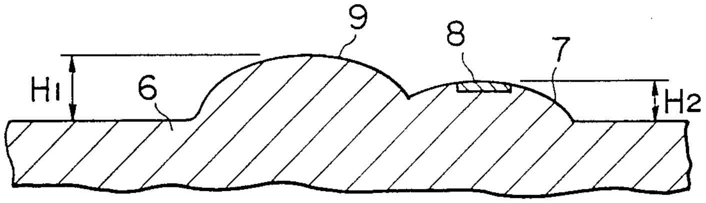

The thermal head in FIG. 6 comprises the pressing part 9 projecting adjacent to the projecting part 7 which projects above the surface of the board or base plate 6 and which is provided with the heat-generating resistance element 8 on the top. In this case also, the height $H_1$ of the pressing part 9 above the plane of the board 6 is greater than the height $H_2$ of the top of the above-described projecting part 7 above the plain of the board or base plate 6.

Figure 7:
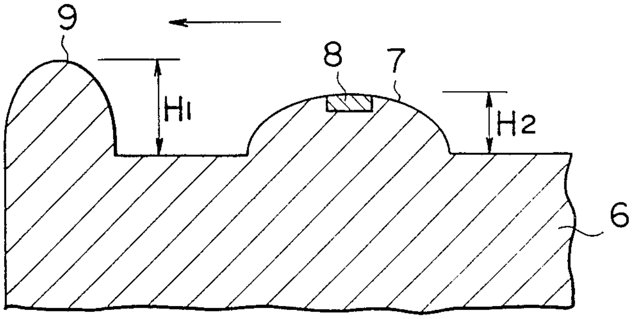

The thermal head in FIG. 7 comprises the projecting part 7 which projects from the surface of the board 6 and is provided with the heat resistant element 8 on the top and the pressing part 9 formed projecting at the edge of the thermal head in the relative progressing direction (arrow mark in the figure) of the heat-sensitive recording medium. In this thermal head also, the height $H_1$ of the pressing part 9 above the plane of the board 6 is greater than the height $H_2$ of the pressing part 9 above the plane of the board 6.

Figure 8:
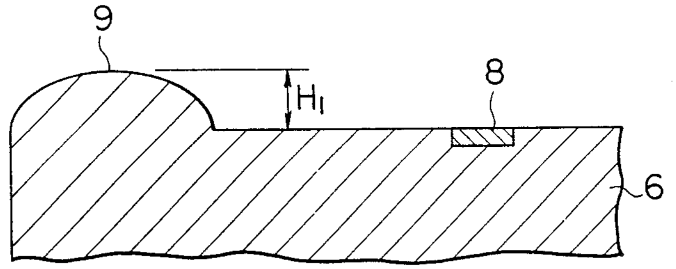

The thermal head in FIG. 8 is similar to the thermal head of FIG. 7 except that the heat generating resistance element 8 is embedded in the board or base plate 6 and the heat generating resistance element 8 is formed without it projecting from the plane of the board 6 or being recessed in the board or base plate 6.

Figure 9:
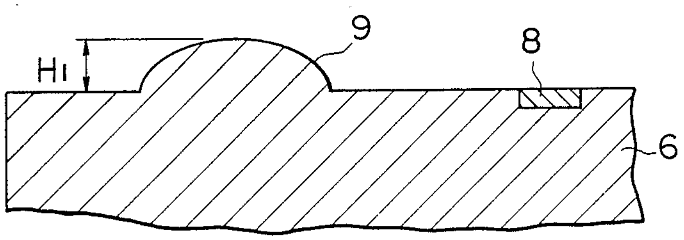

The thermal head in FIG. 9 is similar to the thermal head of FIG. 5 except that the heat generating resistance element 8 is embedded in the board or base plate 6 and he heat-generating resistance element 8 is formed without it projecting from the plane of the board 6 or being recessed therein.

Figure 10:
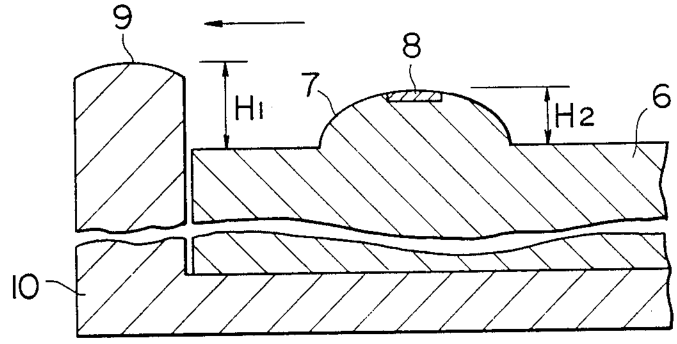

The thermal head in FIG. 10 comprises the projecting part 7 which projects from the surface of the board or base plate 6 and is provided with the heat generating resistance element 8 on the top and the pressing part 9 provided at the edge of the heat radiating plate 10 provided adjacent to the board 6 to radiate the heat generated at the heat-generating resistance element 8 in the relative progressing direction (arrow mark direction in the figure) of the heat-sensitive recording medium. The pressing part 9 has a height $H_1$ extending higher than the height $H_2$ of the above-described projecting part 7.

In the thermal head in FIG. 10, a part of the heat radiating plate 10 forms the pressing part 9. Therefore, such a thermal head is advantageous when the ink layer heated and melted by the heating part is subjected to the cooling process but has not been cooled sufficiently to have proper cohesive power, adhesiveness or shearing property. That is, when pressed, the above-decribed heat radiating plate 10 can remove excessive heat of the ink layer and cool it forcedly so as to be provided with proper cohesive power, adhesiveness or shearing property. Therefore, for example, the pressing part 9 shown in FIG. 10 serves as a heat absorbing means to absorb the heat from the above-described part to be transferred in the cooling process after melting.

In all of the thermal heads shown in above examples, the heating unit and pressing units are positioned separately from each other and the pressing force of the pressing unit is larger than that of the heating part. It cannot be determined indiscriminately how to separate the heating unit and pressing unit. Usually, it is desirable to determine the distance "a" between the heat generating part and the pressing part to satisfy the following equation (1) with respect to the relationship with the printing speed s.

$$0.1 \text{ m sec.} \leqq a/s \leqq 160 \text{ m sec} \quad (1).$$

When a/s is shorter than 0.1 m sec., the ink layer heated by the heating part is not melted and sufficient cohesive power cannot be obtained, while if it is larger than 160 m sec., the ink layer heated by the heating unit is cooled excessively, resulting in a poor shearing property. Therefore, high printing quality cannot be obtained unless the above-described equation (1) is satisfied.

Figure 5A:
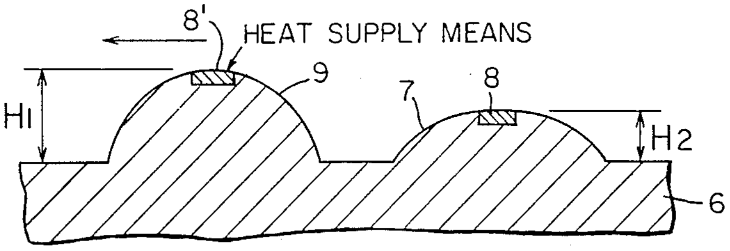

According to this invention, when the ink layer which is melted first by the heating part moves to the cooling process station and presents proper cohesive power, adhesiveness or shearing property, it is timely pressed to the transfer medium. It is desirable, as shown in FIG. 5A, to provide a heat supply means 8 for the pressing part 9 when the ink layer is cooled excessively at the time of pressing in the cooling proccess depending on the contents of the compositions comprising the ink layer or for some other reasons.

The heat supply means is not limited specifically and may be a heat-generating resistance element, etc.

The heat supplied to the ink layer by this heat supply means is enough to provide proper cohesive power, adhesiveness or shearing property for the ink layer.

The acutal valve of the heat is determined depending on the composition of the ink layer, time from the heating part to the pressing part, etc.

As described above, an image is formed on the recording member according to the method of this invention and using the thermal head according to this invention.

Here, for the transfer medium, there are no specific restrictions and any forms and materials may be used such as normal or other papers, OHP sheet or other resin sheets, of high surface smoothness or low surface smoothness such a rough paper, etc. This invention to ensures high printing quality by controlling the nature or characteristics of the ink layer at the time of transfer irrespective of the surface condition of the transfer medium and is not related to the condition of the transfer medium.

Embodiments of this invention are described below. Printing was made using a heat sensitive recording means comprising an ink layer of 4 μm in thickness on a polyethylene terephthalate film of 3.5 μm in thickness.

An evaluation of the high speed printing capability by printing the alphabet on a rough surfaced paper was made using a thermal head of the type shown in FIG. 7 under the conditions below, where the pressing part 9 equipped at the end of the board or base plate 6 is separated by 200 μm from the centre of the protruded part having the heat-generating resistance element comprised of 48 dots on its top.

The energy applied to the head was 30 mJ/head, printing speed was 90 cps, the platen pressure of the printer was 700 g/head and for the recording member a rough surface, TROJAN BOND paper was used.

As the result, no void or lifting of paper fibers occurred in printing and the base of the Trojan bond transfer paper was not stained, presenting high quality printing.

According to the method of this invention, a heat-sensitive recording method which can print at high speed with excellent printing quality even for transfer media of low surface smoothness can be provided.

Using the thermal head according to this invention, thermal heads with the following advantages can be provided:

(1) high-speed printing at high printing quality is possible even for transfer media of low surface smoothness, and (2) since the pressing part and heat sensitive recording resistance are positioned at different places on the board, providing an electrode, etc. near the pressing part is unnecessary and the pressing part can be formed at the edge of the board.

What is claimed is:

1. A method of transferring heat-sensitive ink material coated on a support onto a recording material, comprising:

bringing a heating portion of a thermal head in pressure contact with said support for heating a transfer part of said support, for thereby melting the ink material on said transfer part of said support;

moving said thermal head relative to said support so as to place a pressing portion of said thermal head at the heated transfer part of said support; and pressing said pressing portion on said heated transfer part of said material and onto said recording material with a pressing force larger than that exerted in said pressure contact by said heating portion, for thereby transferring the ink material from said heated transfer part of said support onto said recording material.

2. A thermal head for transferring heat-sensitive ink material coated on a support onto a recording material, comprising:

heating means for coming into pressure contact with said support for heating a transfer part of said support and for exerting a given pressure on said support during said heating;

pressing means for pressing said heated transfer part of said support onto said recording material with a pressing force greater than said given pressure exerted in said pressure contact with said heating means; and holding means for holding said heating means and said pressing means thereon, said pressing means being disposed on said holding means spaced apart from said heating means in a direction so as to press said transfer part after said heating by said heating means.

3. The thermal head of claim 2, wherein:

said holding means includes a base plate, and said heating means and said pressing means are provided on said base plate; and said pressing means protrudes from said base plate so as to be higher than the top of said heating means.

4. The thermal head of claim 3, wherein said holding means comprises a heating radiating plate, said pressing means being provided on said heat radiating plate.

5. The thermal head of claim 3, wherein said pressing means comprises a member for supplying heat to said transfer part of said support which being subjected to a cooling process after having been heated.

6. The thermal head of claim 2, wherein said pressing means comprises a member for supplying heat to said transfer part of said support which being subjected to a cooling process after having been heated.

7. The thermal head of claim 3, wherein said pressing means comprises a member for absorbing heat from said transfer part of said support which being subjected to a cooling process after having been heated.

8. The thermal head of claim 2, wherein said holding means comprises a heating radiating plate, said pressing means being provided on said heat radiating plate.

9. The thermal head of claim 2, wherein said pressing means comprises a member for absorbing heat from said transfer part of said support which being subjected to a cooling process after having been heated.

* * * * *